United States Patent [19]

Shindledecker

[11] Patent Number: 5,461,819
[45] Date of Patent: Oct. 31, 1995

[54] FISHING LURE WITH DIRECTIONALLY CONTROLLABLE REVERSE SWIMMING FEATURE

[76] Inventor: Walter Shindledecker, 132 Alpine Dr., Findlay, Ohio 45840

[21] Appl. No.: 248,412

[22] Filed: May 24, 1994

[51] Int. Cl.⁶ .................................................. A01K 85/00
[52] U.S. Cl. ..................... 43/42.13; 43/42.11; 43/42.22; 43/42.39; 43/42.52
[58] Field of Search ............................... 43/42.11, 42.13, 43/42.22, 42.39, 42.5, 42.52

[56] References Cited

U.S. PATENT DOCUMENTS

| | | | |
|---|---|---|---|
| 181,308 | 8/1876 | Brush | 43/42.11 |
| 1,321,850 | 11/1919 | Rhodes | 43/30 |
| 1,789,630 | 1/1931 | Knight | 43/42.52 |
| 2,588,055 | 3/1952 | Smith | 43/42.52 |
| 2,907,131 | 10/1959 | Bugge | 43/42.22 |
| 3,017,716 | 1/1962 | Hawks | 43/42.39 |
| 3,401,483 | 9/1968 | Bellah et al. | 43/42.39 |
| 3,724,117 | 4/1973 | Flanagan, Jr. | 43/42.24 |
| 3,738,046 | 6/1973 | Johnson | 43/42.39 |
| 3,744,175 | 7/1973 | Bellah et al. | 43/42.39 |
| 3,828,463 | 8/1974 | Perrin | 43/42.11 |
| 3,922,811 | 12/1975 | Ellingson | 43/42.39 |
| 4,037,345 | 7/1977 | Dubois | 43/42.13 |
| 4,044,491 | 8/1977 | Potter | 43/42.22 |
| 4,745,700 | 5/1988 | Davis | 43/42.11 |
| 4,823,500 | 4/1989 | Shindeldecker | 43/42.13 |
| 4,845,883 | 7/1989 | Langer | 43/42 |

*Primary Examiner*—Kurt Rowan
*Attorney, Agent, or Firm*—David C. Purdue; John C. Purdue

[57] ABSTRACT

A lure with outstanding reverse gliding features and unprecedented glide path control features is disclosed. The lure comprises a lure body, a wing, an arm portion which extends upwardly from the wing and a buoyant member which is connected to the upper end of the arm. The arm can be adjusted to control the position of the buoyant member which, in turn, controls the direction of glide, the rate of descent during a glide and the rate of ascent during retrieval. The arm can be adjusted to position the buoyant member in a neutral position where the lure, during gliding, will have a generally straight glide path. The arm can also be adjusted to position the buoyant member in a non-neutral position so that the lure glide path will be generally arcuate.

8 Claims, 4 Drawing Sheets

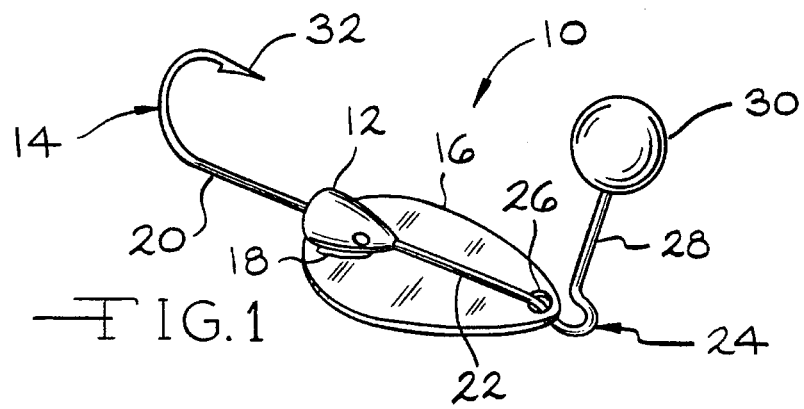
FIG. 1
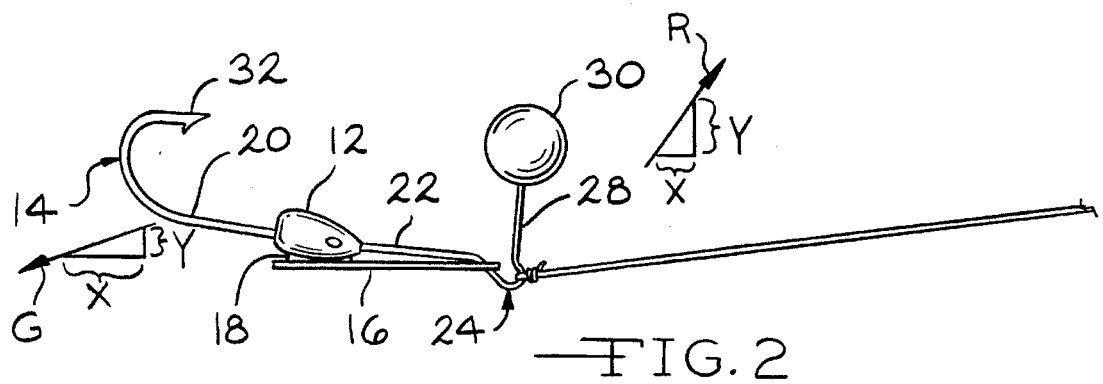
FIG. 2
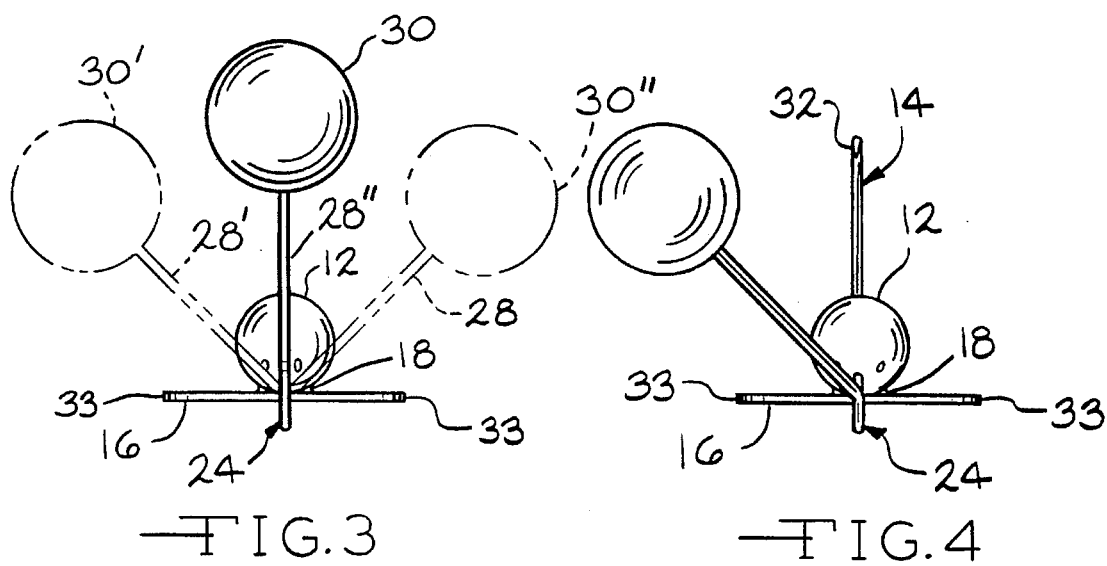
FIG. 3
FIG. 4

FISHING LURE WITH DIRECTIONALLY CONTROLLABLE REVERSE SWIMMING FEATURE

BACKGROUND OF THE INVENTION

1. Field of the Invention

The present invention relates generally to fishing lures and, more specifically, to fishing lures of the type which glide in a reverse direction when in the water, above the bottom, on a slack line.

2. Description of the Prior Art

Fishing lures which have a reverse gliding feature are known. When such a lure is in water, above the bottom on a slack line, the lure glides generally away from the fisherman with a gradual descent ("glide" or "glides"). When the lure is retrieved, the lure moves toward the fisherman with a rapid ascent ("retrieve").

U.S. Pat. No. 3,738,046 discloses lure with a body and a stabilizer wing member. The wing and body are constructed so that, when the lure is on a fishing line in the water, retrieval of the lure, as by reeling in, causes the lure body to assume an angle of about forty-five degrees relative to a horizontal plane (FIG. 8) and continued retrieval of the lure causes it to rise rapidly over a short distance of travel in a direction towards the fisherman who is reeling in. When there is slack in the fishing line, the lure body assumes a more nearly horizontal position (FIG. 9) and the lure glides away from the fisherman, traveling in a direction generally opposite to the direction the lure was traveling when it was being retrieved, although the rate of ascent is greater than the rate of descent. In other words, the lure has a slow rate of descent during a glide and a relatively rapid rate of ascent during retrieval.

U.S. Pat. No. 4,845,883 discloses a gliding fishing lure which also has a reverse gliding feature. This lure has a soft, non-rigid body which is precisely weighted to cause the lure, when suspended in water on a slack line, to glide away from the fisherman. In column 8, lines 19–30, there is disclosed the use of eccentric weights which can be used to control, somewhat, the lateral direction of the lure during a glide. Specifically, a weight comprising a body 76 which has an eccentric potion 74 and a non-eccentric portion 78 is disclosed. The patent states that "when eccentric portion 74 is laterally positioned from the center line of a soft, non-rigid gliding lure, eccentric portion 74 causes the lure to tilt and move in the direction of the lateral position of the eccentric portion." (lines 26 through 30). However, it is noted that, in order to change the direction of glide in a lure according to this patent, one must remove and replace one or more weights.

U.S. Pat. No. 3,744,175 appears to disclose a gliding lure.

U.S. Pat. Nos. 1,321,850 and 3,724,117 disclose lures that, when jigged up and down in the water, travel in a generally circular path. U.S. Pat. No. 3,922,811 also discloses a lure suited for jigging and constructed so that "it will glide forward in a relatively flat descent path when allowed to fall through the water; will appear to dart backwards and upwards when jerked mildly upwardly with the fishing line; and will simulate a head foremost, horizontal swimming action when the top of the line is moved horizontally above the surface of the water without any change in the length of the line." (column 1, lines 39 through 46)

U.S. Pat. No. 3,401,483 discloses a buoyant version of a gliding lure which ascends slowly as it reverse swims.

U.S. Pat. No. 4,823,500 discloses an oscillating lure with an upwardly extending arm and a bulbous member supported thereon. When the lure is retrieved, the bulbous member imparts a substantial side-to-side motion to the lure.

SUMMARY OF THE INVENTION

The present invention is a lure with outstanding reverse gliding features and unprecedented glide control features. The lure comprises a lure body, a wing, an arm portion which extends upwardly from the wing and a buoyant member which is connected to the upper end of the arm. The arm can be adjusted to control, precisely, the direction of glide, the rate of descent during a glide and the rate of ascent during retrieval. All of these properties can be controlled without disassembling the lure or adding weights to it. The arm is manipulated to control the position of the buoyant member, relative to the lure body and wing, thereby affording instant and infinitely variable control of the glide direction as well as the rates of ascent and descent. When the arm is manipulated to position the buoyant member out of a neutral position to one side of the lure, the lure will turn, during a glide, to the side on which the buoyant member is positioned. The combination of the adjustable buoyant member with the lure body and wing produces a lure which has exceptional stability in water during a glide, even when fish attractants such as spinner blades are attached to the lure. The lure body is connected to the wing near the rear of the wing, preferably on the longitudinal axis of the wing.

Accordingly, it is an object of the invention to provide a gliding lure with a new level of lure control during all aspects of fishing.

It is a further object of the invention to provide a gliding lure which can be controlled even if a spinner blade or the like is attached to the lure.

These and other objects and advantages of the present invention will no doubt become apparent to those skilled in the art after they have read the following detailed description of the preferred embodiment which is illustrated by the various drawing figures.

BRIEF DESCRIPTION OF THE DRAWINGS

FIG. 1 is perspective view of a lure according to the present invention.

FIG. 2 is a side view of the lure shown in FIG. 1, attached to a fishing line.

FIG. 3 is a front view of the lure shown in FIGS. 1 and 2, showing various adjustments which can be made to control the glide pattern of the lure.

FIG. 4 is a front view of the lure shown in FIGS. 1 through 3, adjusted for gliding in the manner illustrated in FIG. 5.

DETAILED DESCRIPTION OF THE PREFERRED EMBODIMENT

Figure 5:
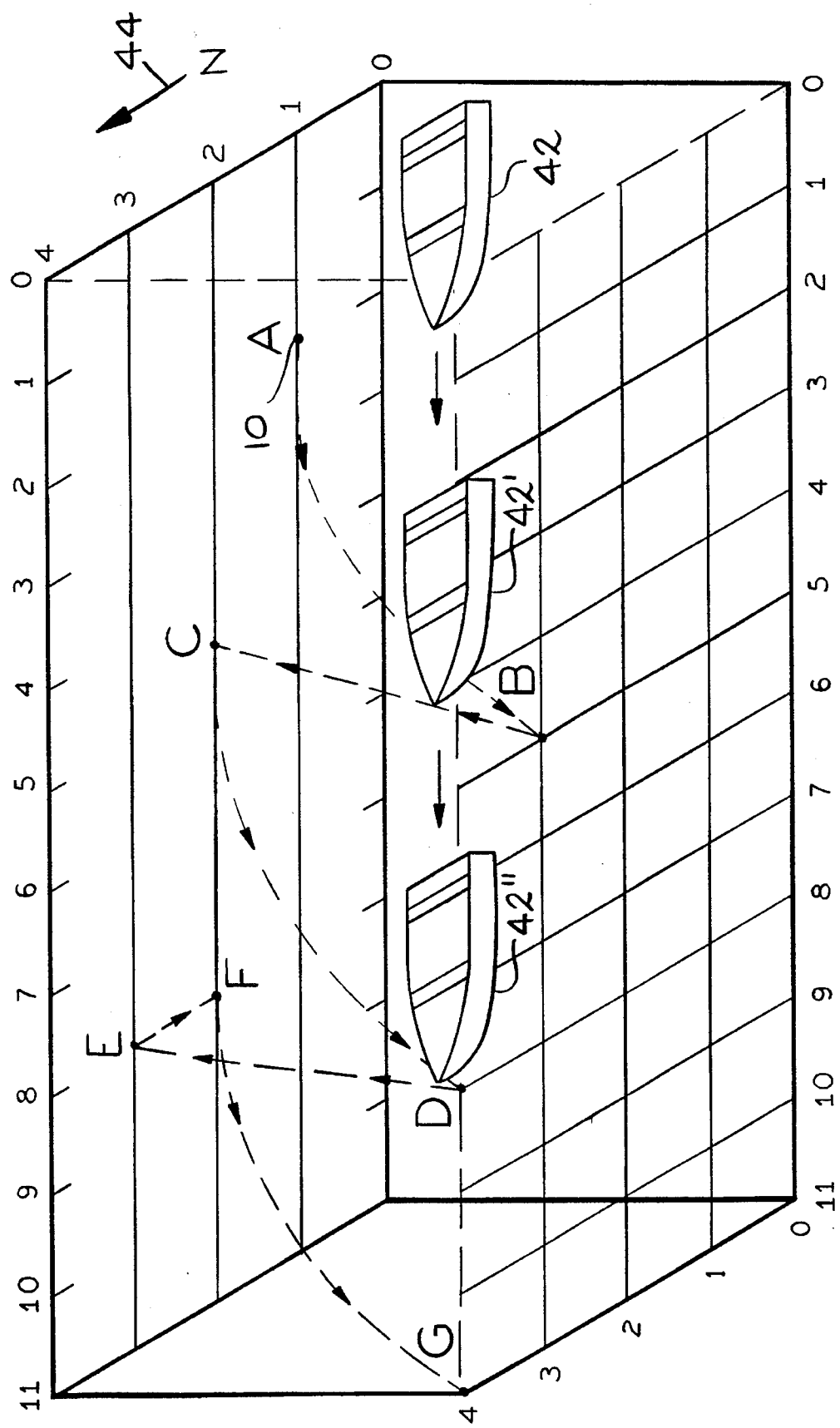
FIG. 5 is a perspective view of a body of water, a boat, and glide paths for a lure adjusted according as illustrated in FIG. 4.

Referring now to FIG. 1, a fishing lure according to the invention is indicated generally at 10. The lure comprises a lure body 12, a hook 14 extending rearwardly of the body 12 and a wing 16 connected to the lure body 12, as by epoxy or other suitable adhesive, indicated at 18, so that the lure body 12 is near the rear of the wing 16, substantially in the center of the lure 10 along its longitudinal axis which coincides, in the illustrated embodiment, with a shank 20 of the hook 14 and a longitudinally extending portion 22 of wire 24. The portion 22 of the wire 24 extends generally forwardly from the body 12 to the front of the wing 16 where it extends through an aperture indicated at 26. A second portion of the wire 24 constitutes an arm 28 which extends generally upwardly from the front of the wing 16. A buoyant member 30 is connected to the upper end of the upwardly extending portion 28 of the wire 24.

In the FIG. 1 embodiment, the hook 14 curves upwardly from the shank 20 and terminates in a barbed point 32. The hook shank 20 is secured in the lure body 12 so that it is rigidly fixed to the body 12. The lure body 12 is a weight which has a density greater than the density of water. The body 12 may be and preferably is formed of lead which is cast around the hook shank 20 (and the eye of the hook which is not shown), as well as the end (not shown) of the longitudinally extending portion 22 of the wire 24, so that both the wire 24 and the hook 14 are fixed relative to the body 12. It will be appreciated that the lure body 12 and the wing 16 can be integrated into a single piece. It is preferred, however, to provide a separate lure body of a castable material such as lead, for the purpose of securing the hook 14 and the wire 24 to the lure 10.

The buoyant member 30 is preferably formed of any material which is buoyant in water, i.e., has a density less than the density of water. The member 30 may be made of a hollow plastic ball, a wood ball or any other suitable buoyant member. The buoyant member 30 is secured to the end of the upwardly extending portion 28 of the wire 24, either rigidly, as shown in FIGS. 1 through 4 or slidingly (not shown) so that, in the water, the buoyant member will be above the wing 16 a sufficient distance that the gliding direction of the lure 10 can be controlled by controlling the position of the buoyant member. Applicant has determined that a lure according to the invention can glide with a buoyant member that has a density which is greater than water if the buoyant member weighs less than the lure body, the wing, the hook and any other components which are part of the lure. As noted above, however, it is preferred that the buoyant member have a density less than water.

The wing 16 is preferably made of a stiff material such as metal. Excellent results have been achieved with the use of standard spinner blades and a variety of sizes are useful.

The lure illustrated in FIGS. 1 through 4, is drawn to scale, slightly larger than actual size. Excellent results have been achieved in a lure comprising a round buoyant member having a diameter of 5⁄8" (1.5 cm), a wing made of a spinner blade having a width of 3⁄4" (~2 cm) and a length of 1 and 3⁄8" (3.5 cm). Further, the buoyant member is supported on an arm so that the center of the buoyant member is approximately 7⁄8" (2¼ cm) above the front of the wing. The lure body is made of lead. Nonetheless, it will be appreciated that these dimensions are illustrative only and that the lure can be produced in a wide variety of dimensions and materials and still have the properties of a lure according to the invention, namely, a given rate of descent, when gliding, a rate of ascent when retrieved which is greater than the given rate of descent and directional control when gliding.

Other combinations of different buoyant members 30, wings 16 and bodies 12 are certainly within the scope of this invention, so long as they combine to produce a lure which can be retrieved with a rapid ascent and can glide with a relatively slow descent. In other words, the lure path during a retrieve will have a given slope (rise/run) in the water, and, when gliding, the lure path will have a different slope which is less than the given slope.

Referring now to FIG. 3, the buoyant member 30 is illustrated in a neutral position where it is directly other the wing 16 and the upwardly extending portion 28 of the wire 24 is oriented substantially perpendicularly to the wing 16, and is approximately halfway between opposed side edges 33 of the wing 16. Hereinafter, neutral position for the buoyant member 30 is intended to mean the position in which, 25 when lure is in the water and the lure is not being retrieved, the lure will glide generally in a straight line in the direction indicated by the arrow designated G in FIG. 2. The lure will descend, gradually, as indicated by the "y" component of the arrow designated G and will travel a substantial distance, relative to a horizontal plane, as indicated by the "x" component of the arrow designated G. Thus, with the buoyant member 30 in the neutral position, the lure glide path will be limited to two dimensions and will be contained within a vertical plane which contains the longitudinal axis of the lure 10.

When the lure is being retrieved with the buoyant member 30 in the neutral position, the lure will tilt in the water so that its longitudinal axis coincides with the arrow designated R in FIG. 2. During retrieval, the lure will ascend generally in a straight line in the direction indicated by the arrow designated R in FIG. 2. The lure will ascend, relatively quickly, as indicated by the "y" component of the arrow designated R and will travel a relatively short distance, relative to a horizontal plane, as indicated by the "x" component of the arrow designated R.

The rate of descent during gliding and the rate of ascent during retrieval can be adjusted, to a minor degree, by bending the upwardly extending arm 28 to move the buoyant member 30 closer to or further away from the hook 14.

Another important feature of a lure according to the invention is that the direction of the lure path during gliding can be controlled by adjusting the position of the upwardly extending arm portion 28 on which the buoyant member 30 is supported to position the buoyant member 30 in a position which is not neutral. Specifically, the arm 28 can be adjusted, as by bending, to position the buoyant member in a non-neutral position in which the lure will glide, not in a relatively straight line, but in an arc, as discussed below in connection with FIGS. 3, 4 and 5.

The upwardly extending portion 28 of the wire 24 on which the buoyant member 30 is attached can be adjusted to position the buoyant member 30 to the left or to the right of the longitudinal axis, as indicated at 30' and 30" in FIG. 3. In order to adjust the lure 10 to position the buoyant member 30 in a non-neutral position, the arm 28 is physically bent so that, when it is released, the buoyant member is in a non-neutral position, such as shown in FIG. 4. With the arm 28 and the buoyant member in the positions illustrated in FIG. 4, the lure can be fished in a unique way which is described below with reference to FIG. 5.

Referring now to FIG. 5, a body of water is indicated generally at 40. The water 40 has a depth D and a boat indicated generally at 42 is adjacent to the body of water 40 so that one in the boat 42 can cast the lure 10 from the boat to fish. A directional arrow 44 pointing north is shown in FIG. 5 and will be used as a reference for directions referred to in the following description of various methods of fishing with the lure. A distance scale appears on the upper right hand edge and the lower left hand edge of the body of water, and it will also be used as a reference for distances in the north and south directions in the following description. Another distance scale appears on the upper front and back edges as well as the bottom of the body of water 40 and it will be used as a reference for distances in the east and west directions in the following description. In the description of lure travel below, it will be assumed that the boat 42 moves west, as indicated by the boat positions designated 42' and 42". The speed of the boat will be assumed to be such that it remains generally due south of the lure 10 at all times.

Starting at a point two units west of the right hand side of the body of water in FIG. 5, the lure 10 is cast in a northerly direction a distance of 1 unit, to a point designated A on the surface of the body of water. The lure 10 corresponds with the adjusted lure shown in FIG. 4, where the buoyant member 30 is in a non-neutral position. The lure 10 is allowed to glide, on a slack line, from point A to a point B on the bottom of the body of water 40. The lure path, represented in phantom lines between points A and B, is generally one fourth of a spiral. From point A to point B, the lure 10 travels a distance of 2 units north from the boat and three units west. At point A, the longitudinal axis of the lure 10 is in a north/south orientation and, when the lure 10 reaches point B, its longitudinal axis is in a generally east/west orientation. From point A to point B, the lure descends from the surface of the body of water 40 to the bottom of the body of water 40. The longitudinal axis of the lure 10 remains tangential to the lure path during the travel from point A to point B.

At point B, the lure 10 is retrieved. When the retrieve is begun, the longitudinal axis of the lure at point B extends in an east/west orientation and the longitudinal axis reorients itself to a generally north/south orientation. As the retrieve is continued, the lure ascends relatively rapidly in the water to a point C on the surface of the body of water 40. The lure path from point B to point C is shown in phantom lines and is generally a straight line. Actually, because the boat 42 is assumed to be moving west, the lure path between B and C will not be quite straight.

At point C, the lure is permitted to glide on a slack line, causing the lure to travel or glide from point C on the surface of the body of water 42 to a point D at the bottom of the body of water 42. The lure path from point C to point D is virtually identical to the path the lure 10 traveled between point A and point B. However, because point C is further north than point A, there will be more line in the water and, the line will drag more heavily on the lure as it glides from point C than when the lure glides from point A. As a result, the arc between points C and D will have a slightly greater diameter than the arc between points A and B. In other words, if the lure is connected to a fishing line and a relatively long length of the line is in the water, the directional control of the lure during gliding will be less pronounced than the directional control of the same lure connected to a fishing line with a relatively short length of line in the water. This effect of fishing line drag has not been accounted for in FIG. 5. Consequently, the point D is two distance units north of point C and three units west of point C. It should also be noted that thick fishing line will create more of a drag than thin fishing line and, therefore, will have a more pronounced effect than thin line on the directional control of the lure path.

At point D, the lure 10 is retrieved and travels one distance unit in a southerly direction and ascends from the bottom of the body of water 42 to the surface, reaching a point E on the surface. The lure 10 is retrieved further and skims across the body of water 42, at or near the surface to a point F.

From point F, the lure glides in a spiral path to a point G along a path which is virtually identical to the lure path from point A to point B and from point C to point D.

It will be appreciated that the lure paths described above are especially suited for use by one in a boat which is moving slowly along a shoreline, as powered by an electric trolling motor. By controlling the gliding and retrieval paths, one can advance the lure along a shoreline while the lure travels towards and away from the shoreline. The lure may remain in the water or on the surface as long as desired, thereby maximizing the chances of a fish striking the lure 10. This makes the lure 10 ideal for use in a modified form of "flipping." In a conventional flipping technique, a boat that is in close to shore is advanced along the shore and a jig is thrown into the water, towards the shore, a relatively short distance from the boat. The lure is retrieved a short distance, removed from the water and re-flipped towards the shore. In a modified form of flipping using a lure according to the invention, the buoyant member is moved to a non-neutral position and the lure is cast or flipped a short distance, perhaps fifteen feet, towards the shore. The fishing line is pulled just enough to align the lure so that its longitudinal axis is substantially perpendicular to the shore. The lure is then permitted to glide towards the shore and in the direction in which the boat is advancing along the shore. The lure is then retrieved a few feet and then it is allowed to glide, again, towards the shore and in tile direction in which the boat is advancing. In this modified form of flipping, the lure need not be removed from the water in order to fish long stretches of shoreline.

Figure 6:
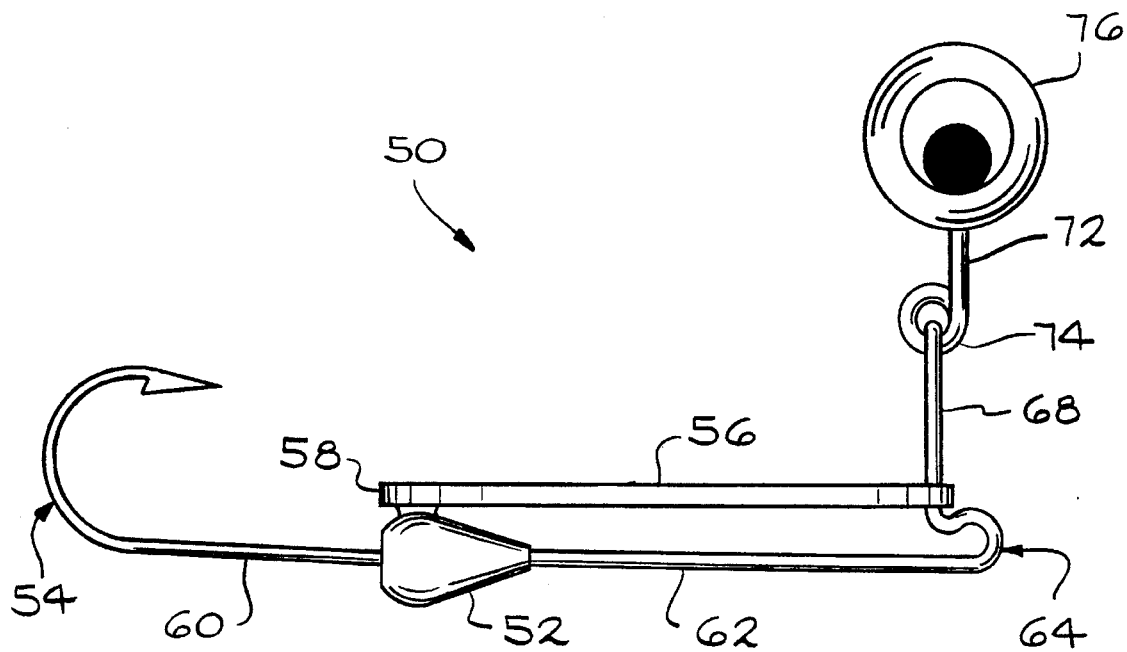
FIG. 6 is a side view of a second embodiment of a lure according to the present invention.
Figure 7:
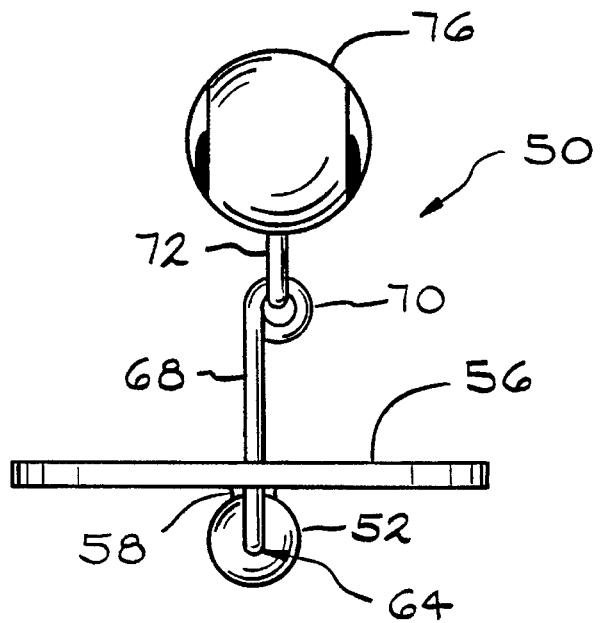
FIG. 7 is a front view of the lure illustrated in FIG. 6.

Referring now to FIGS. 6 and 7, an alternative embodiment of a lure according to the invention is indicated generally at 50. The lure comprises a lure body 52, a hook 54 extending rearwardly of the body 52 and a wing 56 connected to the lure body 52, as by epoxy or other suitable adhesive, indicated at 58, so that tile lure body 52 is near the rear of the wing 56, substantially in the center of the lure 50 along its longitudinal axis which coincides, ill tile illustrated embodiment, with a shank 60 of the hook 54 and a longitudinally extending portion 62 of a wire 64. The portion 62 of the wire 64 extends generally forwardly from the body 52 to the front of the wing 56 where it extends through an aperture (not illustrated) ill the wing 56. A second portion of the wire 64 constitutes an arm 68 which extends generally upwardly from the front of the wing 56 and terminates in a loop connector 70. A second wire 72 has a first end which terminates in a loop connector 74 and a second end to which a buoyant member 76 is connected. The loop connector 70 is loosely connected to the loop connector 74 so that the wire 72 and the buoyant member 75 have limited movement relative to the wing 56 and the lure body 52. This connection does, however, keep the buoyant member 76 generally centered above the wire arm 68. Directional control during gliding is achieved by bending the wire arm 68 to position the buoyant member in a non-neutral position.

Figure 8:
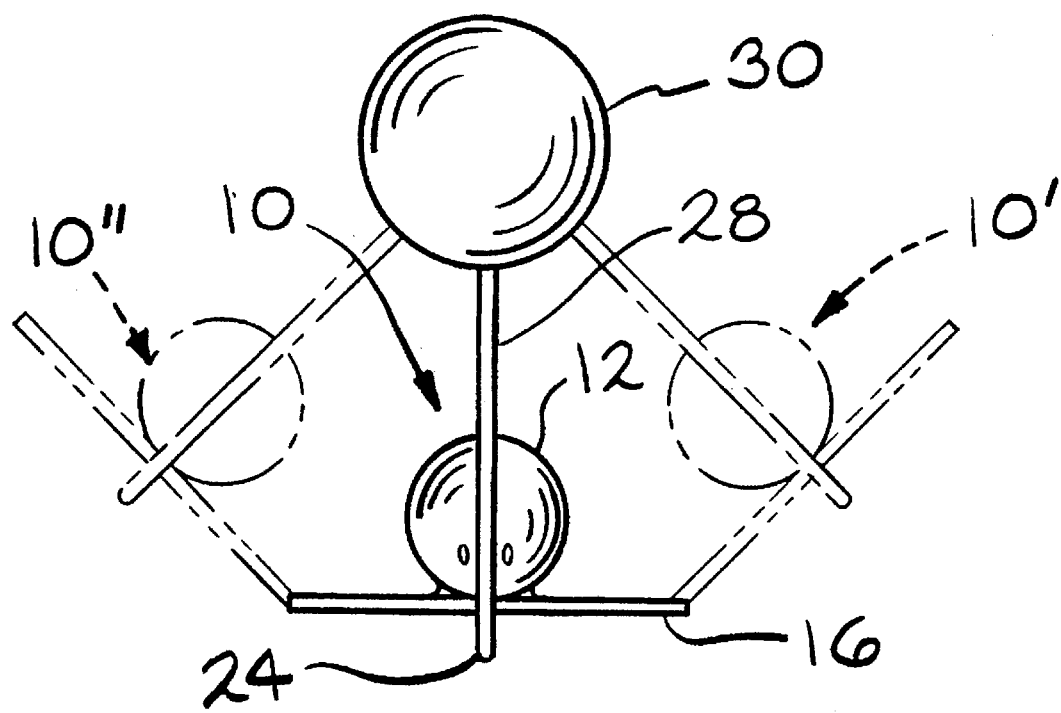
FIG. 8 is a front view of the lure retrieved in water swinging side to side.

Referring now to FIG. 8, a feature of the lure 10 will now be described. When the lure 10 is retrieved in water, the lure 10 wobbles or swings from side to side. In doing so, the lure appears to pivot, generally about the buoyant member 30. The lure 10 has been observed to pivot over something like a 90 degree arc. In other words, the lure 10 pivots from the center position shown in solid lines approximately 45 degrees to the position, indicated in phantom lines and identified by reference numeral 10'. At that point, the lure 10 swings back to the central position and past it to the position indicated in phantom lines and identified by reference numeral 10". Finally, the lure swings back to the position indicated by reference numeral 10' and this cycle repeats so long as the lure is being retrieved. This wobble is believed to be a significant fish attractant.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A fishing lure comprising:
   a generally planar wing having a rear portion and a front portion,
   a lure body connected to said wing and positioned adjacent to said rear portion thereof, said lure body having a weight,
   at least one hook connected to and supported on the lure,
   a buoyant member having a weight which is less than the weight of said lure body, and
   an arm connected to the lure and extending generally upwardly from the wing near said front portion thereof, said buoyant member being supported on said arm and said arm being supported relative to said wing so that, when the lure is in the water on a slack line, said buoyant member is supported above said wing and said wing is positioned so that it causes the lure to glide in a reverse direction with a rate of descent, said arm being adjustable so that it is operable to support said buoyant member in a plurality of positions, relative to said wing, including a first, neutral position and a second, non-neutral position,
   wherein the lure reverse glides in a generally straight path when said buoyant member is supported in said first, neutral position and wherein the lure glides in a generally arcuate path when said buoyant member is supported in said second, non-neutral position.

2. The lure claimed in claim 1 wherein said buoyant member has a density which is less than the density of water.

3. The lure claimed in claim 2 wherein said buoyant member is attached to an upper end of said upwardly extending arm.

4. The lure claimed in claim 1 wherein, when the lure is retrieved in the water, it wobbles from side to side pivoting generally about said buoyant member.

5. The lure claimed in claim 1 wherein said lure body comprises a piece of lead.

6. The lure claimed in claim 5 wherein said at least one hook is secured to the lure body.

7. A fishing lure comprising:
   a generally planar wing having a rear portion and a front portion,
   a lure body connected to said wing and positioned adjacent to said rear portion thereof, said lure body having a density greater than the density of water,
   at least one hook connected to and supported on the lure,
   a buoyant member having a density which is less than the density of water, and
   an arm connected to the lure and extending generally upwardly from the wing near said front portion thereof, said buoyant member being supported on said arm and said arm being supported relative to said wing so that, when the lure is in the water on a slack line, said buoyant member is supported above said wing and said wing is positioned so that it causes the lure to glide in a reverse direction with a rate of descent, said arm being adjustable so that it is operable to support said buoyant member in a plurality of positions, relative to said wing, including a first, neutral position and a second, non-neutral position,
   wherein the lure reverse glides in a generally straight path when said buoyant member is supported in said first, neutral position and wherein the lure glides in a generally arcuate path when said buoyant member is supported in said second, non-neutral position.

8. The lure claimed in claim 7 wherein, when the lure is retrieved in the water, it wobbles from side to side pivoting generally about said buoyant member.

\* \* \* \* \*

UNITED STATES PATENT AND TRADEMARK OFFICE
CERTIFICATE OF CORRECTION

PATENT NO. : 5,461,819
DATED : Oct. 31, 1995
INVENTOR(S) : Walter Shindeldecker It is certified that error appears in the above-identified patent and that said Letters Patent is hereby corrected as shown below:

Column 4, Line 12 should read
  which, when lure is in the water and the lure is not being Column 6, Line 28 should read
  again, towards the shore and in the direction in which the Column 6, Line 37 should read
  adhesive, indicated at 58, so that the lure body 52 is near the Column 6, Line 39 should read
  along its longitudinal axis which coincides, in the illustrated Column 6, Line 44 should read
  aperture (not illustrated) in the wing 56. A second portion of Signed and Sealed this Seventh Day of May, 1996

*Attest:*

BRUCE LEHMAN

*Attesting Officer*     *Commissioner of Patents and Trademarks*